United States Patent Office 3,558,741
Patented Jan. 26, 1971

---

3,558,741
IMIDO-SUBSTITUTED ORGANOPOLYSILOXANE COMPOSITIONS
Fred F. Holub and Milton L. Evans, Schenectady, N.Y., assignors to General Electric Company, a corporation of New York
No Drawing. Filed May 5, 1969, Ser. No. 821,966
Int. Cl. C08f 35/02; C08g 31/24, 47/10
U.S. Cl. 260—827
9 Claims

ABSTRACT OF THE DISCLOSURE

Curable organopolysiloxane compositions are provided and a method for making them, comprising organopolysiloxane having one or more aliphatically unsaturated imido organo radicals attached to silicon through a carbon-silicon bond. The curable organopolysiloxane compositions can be in the form of blends of such imido-substituted organopolysiloxane in combination with at least one olefinically unsaturated monomer, such as N-phenylmaleimide, bismaleimide, styrene, etc., or at least one polymer, such as polycarbonate, polyvinylchloride, etc., or mixtures thereof.

---

The present invention relates to curable compositions comprising organopolysiloxane having chemically-combined aliphatically unsaturated imido radicals and methods for making such materials.

The curable compositions of the present invention comprise organopolysiloxane having attached to silicon by carbon-silicon bonds at least one chemically-combined imido organo radical of the formula (1)

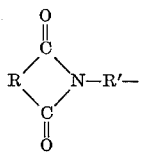

where R is an aliphatically unsaturated divalent organic radical selected from the class consisting of hydrocarbon radicals and halogenated hydrocarbon radicals and R' is a divalent organo radical selected from hydrocarbon radicals and halogenated hydrocarbon radicals. Some of the radicals included by R of Formula 1 are, for example,

where X is hydrogen, chloro, or methyl,

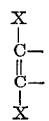

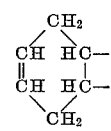

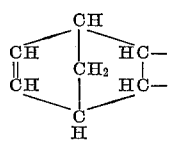

etc. Imido-substituted organopolysiloxanes included within the scope of the invention have the formula (2)
$$(M)_a SiO\frac{(R'')_b}{\frac{(4-a-b)}{2}}$$

where R'' is selected from monovalent hydrocarbon radicals, halogenated monovalent hydrocarbon radicals, and cyanoalkyl radicals, M is a monovalent aliphatically unsaturated organo imido radical included by Formula 1, attached to silicon by a carbon-silicon bond, $a$ has a value equal to .002 to 3 inclusive, $b$ has a value equal to from 0 to 2.5 inclusive, and the sum of $a+b$ has a value equal to from 1 to 3 inclusive.

Included by Formula 2, are imido-substituted organopolysiloxanes of the formula, (3)

where the various terms are as previously defined, and $n$ is an integer equal to from 1 through 1,000, inclusive.

Radicals included by R' of Formula 1 are, for example, alkylene radicals such as methylene, ethylene, propylene, butylene, pentylene, etc., arylene radicals such as phenylene, tolylene, naphthylene, etc. Radicals included by R'' of Formula 2 are, for example, aryl radicals such as phenyl, tolyl, naphthyl, etc.; halogenated aryl radicals, such as chlorophenyl, chloronaphthyl, etc.; aliphatic and cyclohalophatic radicals, such as alkyl and haloalkyl radicals, for example, methyl, ethyl, chloroethyl, propyl, butyl, pentyl, hexyl, heptyl, octyl, etc.; alkenyl radicals such as vinyl, allyl, etc.; cycloaliphatic radicals, such as cyclopentyl, cyclohexyl, etc.; cyanoalkyl radicals, such as cyanoethyl, cyanopropyl, cyanobutyl, etc. Radicals included by R, R' and R'' of Formulas 1, 2 and 3 can be all the same radical, or a mixture of any two or more of the aforementioned radicals.

Imido-substituted organopolysiloxanes of the present invention can be made by effecting reaction between an aliphatically unsaturated anhydride of the formula, (4)

and an aminoorganosiloxane of the formula, (5)
$$(NH_2R')_a SiO\frac{(R'')_b}{\frac{(4-a-b)}{2}}$$

where R, R', R'', $a$ and $b$ are as defined above.

In the course of effecting reaction between the unsaturated anhydride of Formula 4, and the aminoorganosiloxane of Formula 5, the corresponding amide acid shown by the following formula also can be isolated, if temperatures up to 60° C. are employed

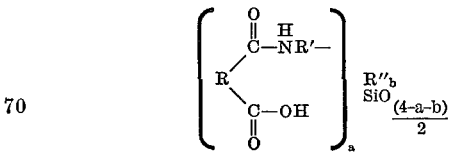

where R, R', R", a and b are as previously defined. These amide acids can provide for electrocoating solutions, employing techniques described in Holub application, Ser. No. 548,000, filed May 5, 1966, now U.S. Patent No. 3,507,765 and assigned to the same assignee as the present invention.

Another method of making the imido-substituted organopolysilanes of the invention is by employing imido-substituted organosilanes of the formula, (6) 

where M and R" are as previously defined, Y is a hydrolyzable radical, c is an integer equal to 1 to 3 inclusive, d is a whole number equal to 0 to 2 inclusive, and the sum of c and d is equal to 1 to 3 inclusive. The imido-substituted organosilanes of Formula 6, and methods for making them are shown in our copending application Ser. No. 821,969, filed concurrently herewith, and assigned to the same assignee of the present invention.

There are included by the unsaturated anhydrides of Formula 4, for example

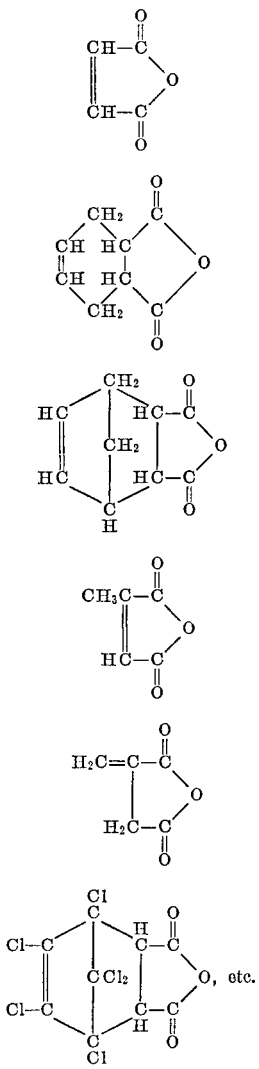

Included by the aminoorganosiloxanes of Formula 5, are materials having at least one chemically-combined aminoorganosiloxy unit of the formula,

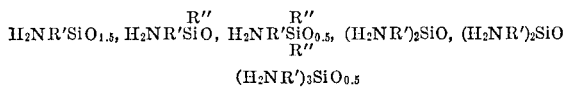

where R' can be ethylene, propylene, butylene, phenylene, etc. and R" can be methyl, ethyl, phenyl, cyanoethyl, etc.

The aminoorganosiloxane also can include the aforesaid aminoorganosiloxy units chemically-combined with organosiloxy units of the formula, such as $R''SiO_{1.5}$, $(R'')_2SiO$ and $(R'')_3SiO$ units, where R" is as previously defined. Among the preferred aminoorganosiloxanes of Formula 5, there are included disiloxanes of the formula, (7) 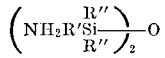

where R' and R" are as previously defined. Some of the methods for making aminoorganosiloxanes of Formula 5 are, for example, shown by Bailey, patent 2,947,771, and J. E. Mulvaney and C. S. Marvel, J. Polymer Science 50, 541–7.

A particular preferred form of the imido-substituted organopolysiloxanes of Formula 3, are imido-substituted disiloxanes of the formula, (8) 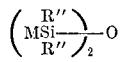

where R" and M are as previously defined. The imido-substituted disiloxanes of Formula 8 can be made by effecting reaction between the aminodisiloxanes of Formula 7 and the unsaturated anhydrides of Formula 4.

Another method which can be employed to make the imido-substituted disiloxanes of Formula 8, is by effecting addition between an imido-substituted olefinically unsaturated organic material, and a siloxane hydride as shown as follows:

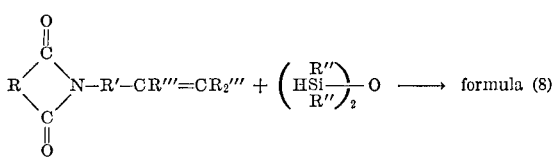

where R''' is selected from hydrogen and alkyl radicals such as methyl, ethyl, etc.

The idimo-substituted disiloxanes of Formula 8 can be equilibrated with organocyclopolysiloxane of the formula, (9) 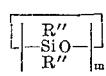

where m is an integer equal to 3 to 8, to produce the polydiorganosiloxanes of Formula 3.

The imido-substituted organopolysiloxanes of Formula 2, also can be made by hydrolyzing the imido-substituted organosilanes of Formula 6. Depending upon the number or average number of Y radicals attached to silicon, where Y can be, for example, chloro, ethoxy, diethylaminoxy, etc., the resulting imido-substituted organopolysiloxane can be a fluid, resin or gum. The imido-substituted organosilanes of Formula 6 can be cohydrolyzed with organosilanes of the formula,

where R" and Y are as previously defined, and e is an integer equal to 1 to 3 inclusive.

The imido-substituted organopolysiloxanes of the present invention can be blended with aliphatically unsaturated organic materials, such as aliphatically unsaturated organic monomers, and organic polymers. The proportions of the imido-substituted organopolysiloxane and the aliphatically unsaturated organic material, which hereinafter will signify either the aliphatically unsaturated monomer, organic polymer, or mixture thereof, can vary widely.

Blends of the imido-substituted organopolysiloxanes and the aforementioned aliphatically unsaturated organic material can be made over wide proportions by weight. Experience has shown that there should be employed at least about 15%, by weight, of the imido-substituted organopolysiloxanes to provide for cured products exhibiting such valuable characteristics as corona resistance, solvent resistance flexiblility, etc. Depending upon the proportion of the imido-substituted organopolysiloxane and the aliphatically unsaturated monomer or polymer, the curable blends can provide for laminates, solventless varnishes, molding compounds, coating compositions, etc. Included by the aliphatically unsaturated monomers that can be employed in combination with the imido-substituted organopolysiloxanes are, for example, styrene, m-phenylene bismaleimide, N-phenylmaleimide, diallylphthalate, vinyl chloride, isobutylene, butadiene, isoprene, chlorotrifluoroethylene, 2-methylpentene-1; vinyl esters of organic carboxylic acid, such as vinyl formate, vinyl acetate, acrylonitrile, vinyl methyl ether, vinyl methyl ketone; acrylic esters, such as methyl-, ethyl-, butyl-, etc., esters of acrylic and methacrylic acids, etc.; divinyl benzene, triallyl citrate, triallyl cyanurate, N-vinyl phthalimide, N-allyl phthalimide, N-allyl tetrachlorophthalimide, etc. Among the organic polymer that can be employed in combination with the imido-substituted organopolysiloxanes of the present invention are, for example, polyvinylchloride, polyethylene, polypropylene, polycarbonates, polysulfones, polystyrene, polyurethane, polyesters, polyphenyleneoxides, acrylonitrile-butadiene-styrene terpolymers, propylene-ethylene copolymers, etc.

The curable organopolysiloxanes of the present invention can be cured to the infusible, or elastomeric state with heat, conventional free radical initiators, irradiation with high energy electrons, X-rays, electromagnetic waves, etc., depending upon the crosslink density of the resulting cured composition. For example, a linear polydiorganosiloxane included by Formula 3 can provide for an elastomer or a thermoset depending upon the value of $n$. When $n$ is greater than 5, for example, an elastomer can be made. Cure of the imido-substituted organopolysiloxanes also can be achieved with room temperature vulcanizing curing catalysts, such as shown by Beers, Pat. 3,382,205, assigned to the same assignee as the present invention, when utilizing silanol terminated imide substituted polydiorganosiloxane, such as polymer consisting essentially of chemically combined

units and

units. Cure of the imido-substituted polydiorganosiloxane also can be achieved by employing organosilicon hydrides and platinum catalysts as taught by Chalk, Pat. 3,344,111, assigned to the same assignee as the present invention.

When effecting the cure of the curable compositions of the invention by use of free radical initiators, a temperature of from 50° C. to 300° C. can be employed while 125° C. to 200° C. have sometimes been found to be more desirable. Acceleration of the cure can be achieved with organic peroxides such as dicumyl peroxide, benzoyl peroxide, tertiary butyl perbenzoate, azobis-isobutyronitrile, tertiary-alkyl peroxycarbonate, etc. These can be employed from about 0.01 percent up to about 5 percent, by weight, of peroxides, based on the weight of the material undergoing cure.

In preparing the imido-substituted organopolysiloxanes of Formula 3 by the anhydride-amine method, reaction can be effected at temperatures between 40° C. to 200° C. Reaction times of as little as two minutes or less to four hours, or more, will depend on such factors as the reactants employed, conditions utilized, presence or absence of solvents, dehydrating agents, etc. A suitable organic solvent has in particular instances been found to facilitate the removal of water formed during the anhydride-amine condensation which can be azeotroped from the mixture. A suitable organic solvent is any solvent inert to the reactants under reaction conditions which facilitate the separation of water from the mixture. For example, there are included organic solvents, such as N, N-dimethylformamide, toluene, benzene, pyridine, etc.

Equilibration of the imido-substituted disiloxane of Formula 8 and organocyclopolysiloxane of Formula 9 can be performed at temperatures between 20° C. to 160° C., and preferably 30° C. to 100° C. A standard equilibration catalyst such as sulfuric acid, a phosphorous halogen compound, as disclosed in Bluestein, Pat. 3,271,359 asigned to the same assignee as the present invention, etc., can be employed.

In instances where addition between siloxane hydride and imido-substituted aliphatically unsaturated monomer is effected to make imido-substituted organopolysiloxane, a platinum catalyst such as chloroplatinic acid, can be employed along with a suitable organic solvent. Other platinum catalysts include Lamoreau, Pat. 3,220,972, Ashby, Pat. 3,159,601, etc. assigned to the same assignee as the present invention.

A further method of preparing the imido-substituted organopolysiloxanes of the present invention involves the hydrolysis of imido-substituted organosilanes of Formula 6, or the cohydrolysis of such silanes with other organosilanes previously described having hydrolyzable radicals attached to silicon and monovalent organic radicals, such as monovalent hydrocarbon radicals, halogenated monovalent hydrocarbon radicals and cyanoalkyl radicals.

In addition to the aforementioned aliphatically unsaturated monomers and organic polymers which can be employed with the imido-substituted polysiloxanes, there also can be employed in proportions of 0 to 200 parts of fillers, per 100 parts of the imido-substituted organopolysiloxane, such as treated clay, ground quartz, fume silica, said, carbon black, glass fibers, glass beads, carbon fiber, boron fiber, quartz fiber, etc. In addition, other ingredients such as solvents at from 60% to 90% by weight of the curable compositions such as N-methyl pyrollidone, dimethylacetamide, toluene, methylene chloride, methylacetate, methylethylketone, plasticizers such as trioctyl trimellitate, diisodecylphthalate, etc. also can be utilized.

In order that those skilled in the art will be able to master the invention, the following examples are given by way of illustration and not by way of limitation. All parts are by weight.

EXAMPLE 1

A mixture of 19.6 parts of maleic anhydride and 50 parts of N,N-dimethylformamide was added to a mixture of 27.6 parts of bis(δ-aminobutyl)tetramethyldisiloxane and 100 parts of N,N-dimethylformamide. The mixture was stirred at 40° C. for four hours and then refluxed for six hours. The mixture was then stripped of solvent and the residue was dissolved in ether. The ether solution was washed with a 10% potassium carbonate solution and then further washed with distilled water. The mixture was then stripped of ether. The product was then dried azeotropically with toluene, and further vacuum stripped of solvent. Based on method of preparation, the product was bis(δ-maleimidobutyl)tetramethyldisiloxane. Its identity was further confirmed by elemental analysis, and its infrared and NMR spectra.

EXAMPLE 2

There are added 27.6 parts of bis(δ-aminobutyl)-tetramethyldisiloxane to a mixture of 30 parts of tetrahydrophthalic anhydride and 100 parts of dry toluene. The mixture is stirred for 16 hours. There is then added to the mixture, two parts of p-toluenesulfonic acid and the resulting mixture is refluxed. When the water of reaction has been completely removed, the reaction product is washed with a five percent sodium bicarbonate solution and then dried azeotropically. Based on method of preparation, and its infrared and NMR spectra, the product is bis(δ-tetrahydrophthalimidobutyl)-tetramethyldisiloxane.

EXAMPLE 3

There is added 27.6 parts of bis(δ-aminobutyl)tetramethyldisiloxane to a mixture of 33 parts of endomethylene-tetrahydrophthalic anhydride and 100 parts of dry toluene. The mixture is stirred for 16 hours and two parts of pyridine are added. The mixture is then refluxed until the water of reaction is completely removed. The product is then stripped under reduced pressure. Based on method of preparation, the product is bis(δ-endomethylenetetrahydrophthalimidobutyl)-tetramethyldisiloxane.

EXAMPLE 4

A mixture of 44 parts of bis(δ-maleimidobutyl)tetramethyldisiloxane, 7.4 parts of octamethylcyclotetrasiloxane, and one part of 95.5 percent sulfuric acid is heated for four hours at 80° C. The mixture is allowed to cool to room temperature and 10 grams of water are added. The organopolysiloxane layer is recovered and washed twice with 10 parts of water. The product is then dried over anhydrous potassium carbonate. Based on the method of preparation, the product is a δ-maleimidobutyldimethylsiloxy chain-stopped polydimethylsiloxane. The identity of the product is further confirmed by its infrared spectrum.

EXAMPLE 5

A mixture of 30 parts of bis(δ-tetrahydrophthalimidobutyl)tetramethyldisiloxane, 7.4 parts of octamethylcyclotetrasiloxane and one part of 95.5 percent sulfuric acid is stirred for four hours at a temperature of 80° C. The mixture is allowed to cool and washed three times with 10 parts of water. The product is then dried over potassium carbonate. Based on method of preparation, the product is a δ-tetrahydrophthalimidobutyldimethylsiloxy chain-stopped polydimethylsiloxane. Its identity is further confirmed by its infrared spectrum.

EXAMPLE 6

A mixture of 27.6 parts of bis(γ-aminopropyl)tetramethyldisiloxane, 7.4 parts of octamethylcyclotetrasiloxane, and one part of potassium hydroxide is stirred for four hours at 80° C. The mixture is allowed to cool to room temperature. The mixture is then neutralized with a standard hydrochloric acid solution. The mixture is then washed several times with water and dried over anhydrous potassium carbonate. Based on method of preparation, the product is a γ-aminopropyldimethylsiloxy terminated polydimethylsiloxane.

There is added to 35 parts of the above γ-aminopropyldimethylsiloxy terminated polydimethylsiloxane, 33 parts of endomethylene tetrahydrophthalic anhydride in 100 parts of toluene. To the resulting mixture, there is added .01 part of pyridine. The resulting mixture is refluxed until the water of reaction is azeotroped. The mixture is then stripped of toluene. Based on method of preparation, the product is a γ-endomethylenetetrahydrophthalimidodimethylsiloxy terminated polydimethylsiloxane. Its identity is further confirmed by its infrared spectrum.

EXAMPLE 7

An equal molar solution in hexane of maleic anhydride and γ-aminopropyltriethoxysilane containing about .1 percent by weight of pyridine was refluxed until all of the water of reaction was separated. The mixture was then stripped of solvent. There was obtained a soft white solid. Based on method of preparation, the product was γ-maleimidopropyltriethoxysilane. Its identity was further confirmed by elemental analysis and its infrared spectrum.

10 grams of the above silane are added to 100 grams of a one percent sulfuric acid solution. The mixture is heated for 30 minutes at a temperature of about 80° C. The product is recovered by decanting the water from the mixture. Based on method of preparation, the product is an organopolysiloxane consisting essentially of chemically-combined γ-maleimidopropylsiloxy units. The product is dissolved in toluene and a film is cast from the resulting solution. The film is found to exhibit valuable insulating characteristics.

EXAMPLE 8

There are added 33 parts of endomethylenetetrahydrophthalic anhydride to a mixture of 30 parts of γ-aminopropylmethyldimethoxysilane, 150 parts of anhydrous toluene, and two parts of pyridine. An exothermic reaction occurs immediately. The mixture is refluxed until all of the water formed during the reaction is removed. The mixture is then stripped of toluene under reduced pressure. Based on method of preparation, the product is γ - endomethylenetetrahydrophthalimidepropylmethyldimethoxydisilane. Its identity is further confirmed by its infrared spectrum.

A mixture of 100 parts of a silanol terminated polydimethylsiloxane having an average of about 18 chemically-combined dimethylsiloxy units, 10 parts of the above silane, and 0.1 part of stannous octoate is heated at 80° C. for about 10 hours. The viscosity of the mixture gradually increases. A product is obtained having a significantly higher molecular weight than the aforementioned silanol-terminated polydimethylsiloxane. Based on method of preparation, the product is a high molecular weight silanol terminated polydimethylsiloxane consisting essentially of chemically-combined blocks of polydimethylsiloxane joined together by γ-endomethylenetetrahydrophthalimidopropylsiloxy units.

EXAMPLE 9

Several blends were prepared of bis(δ-maleimidobutyl)tetramethyldisiloxane and various organic polymers. The blends were milled at a temperature between 90° C. to 140° C., and consisted of 20 parts of the imido substituted disiloxane, 80 parts of organic polymer, and two parts of dicumylperoxide. The blends were then molded for 30 minutes at 150° C. Test slabs were measured for "T," tensile (p.s.i.) and "E," elongation (percent), at 25° C. and 100° C. Corona resistance "CR," is the factor obtained by dividing the breakdown time, at 1,200 volts and 3,160 hertz of the test slab, as compared to the breakdown time of a polyethyleneterephthalate film of equivalent thickness. The results obtained are shown as follows:

| Polymer | T | | E | | CR |
| --- | --- | --- | --- | --- | --- |
| | RT | 100° C. | RT | 100° C. | |
| Polyethylene (M.W. 22,000) | 1,840 | 300 | 190 | 300 | >23 |
| Ethylenepropylene 1,4-hexadiene terpolymer | 500 | 150 | 430 | 170 | >23 |
| Polyvinylchloride | 6,910 | 1,700 | <10 | 200 | >23 |
| Acrylonitrile-butadiene-styrene terpolymer | 4,300 | 1,100 | 20 | 165 | |

EXAMPLE 10

Various blends were made of bis(δ-maleimidobutyl)-tetramethyldisiloxane and several aliphatically unsaturated organic monomers. The blends consisted of 20% by weight of the disiloxane and 80% by weight of the organic monomer, which included styrene, diallyl phthalate, and N-phenylmaleimide. Solutions of the blends were made which contained 66% by weight of organic solvent. The styrene and diallyl phthalate blends were dissolved in N-methylpyrollidine and the N-phenylmaleimide blend was dissolved in ethylenedichloride. There was also added to each of the blends about 0.3% by weight of benzoylperoxide.

The solution blends, as described above, were poured onto aluminum substrates. They were cured at 80° C. for 30 minutes and then for an additional 30 minutes at 125° C. and for 60 minutes at 200° C. All of the blends produced strong self-supporting films that were flexible and insoluble in methylene chloride. The films made from styrene and diallylphthalate remained self-supporting at temperatures of up to 250° C. All of the films were found to be valuable insulating materials.

Although the above examples illustrated only a limited number of the many imido-substituted organopolysiloxanes provided by the present invention, as well as curable blends of these materials and methods for making them, it should be understood that the present invention is directed to a much broader class of materials and methods for making them as shown by the description preceding these examples.

We claim:
1. A curable organopolysiloxane composition comprising an imido-substituted organopolysiloxane and an organic polymer, where the imido-substituted organopolysiloxane has the formula,

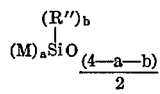

and is present in the curable organopolysiloxane composition at a proportion of at least 15 percent by weight and the organic polymer is a member selected from the class consisting of polyvinylchloride, polyethylene, polypropylene, polycarbonates, polysulfones, polystyrene, polyurethane, polyesters, polyphenyleneoxides, acrylonitrile-butadiene-styrene terpolymers, and propylene-ethylene copolymers, M is an imido organo radical of the formula,

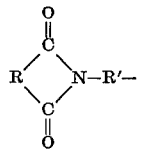

wherein R is an aliphatically unsaturated divalent organic radical, selected from the class consisting of hydrocarbon radicals and halogenated hydrocarbon radicals, R' is a divalent organo radical selected from the class consisting of hydrocarbon radicals and halogenated hydrocarbon radicals, R" is selected from monovalent hydrocarbon radicals, halogenated monovalent hydrocarbon radicals and cyanoalkyl radicals, $a$ has a value equal to .002 to 3 inclusive, and $b$ has a value of 0 to 2.5 inclusive, and the sum of $a+b$ has a value of 1 to 3 inclusive.

2. A curable organopolysiloxane composition in accordance with claim 1, where the organic polymer is polyethylene.

3. A curable organopolysiloxane composition in accordance with claim 1, where the organic polymer is polyvinylchloride.

4. A curable organopolysiloxane composition in accordance with claim 1, where the aliphatically unsaturated organic polymer is ethylene-propylene 1,4-hexadiene terpolymer.

5. A curable organopolysiloxane composition in accordance with claim 1, where the organic polymer is poly(acrylonitrile-butadiene-styrene).

6. A curable organopolysiloxane composition comprising an imido-substituted organopolysiloxane and an aliphatically unsaturated organic monomer where the imido-substituted organopolysiloxane has the formula,

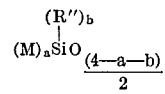

and is present in the curable organopolysiloxane composition at a proportion of at least 15 percent by weight, and the aliphatically unsaturated organic monomer is selected from the class consisting of styrene, m-phenylene bismaleimide, N-phenylmaleimide, diallylphthalate, vinyl chloride, isobutylene, butadiene, isoprene, chlorotrifluoroethylene, 2-methylpentene-1, vinyl formate, vinyl acetate, acrylonitrile, vinyl methyl ether, vinyl methyl ketone, esters of acrylic acid, esters of methacrylic acids, divinyl benzene, triallyl citrate, triallyl cyanurate, N-vinyl phthalimide, N-allyl phthalimide and N-allyl tetrachlorophthalimide, and M is an imido organo radical of the formula

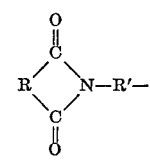

wherein R is an aliphatically unsaturated divalent organic radical, selected from the class consisting of hydrocarbon radicals and halogenated hydrocarbon radicals, R' is a divalent organo radical selected from the class consisting of hydrocarbon radicals and halogenated hydrocarbon radicals, R" is selected from monovalent hydrocarbon radicals, halogenated monovalent hydrocarbon radicals and cyanoalkyl radicals, $a$ has a value equal to .002 to 3 inclusive, and $b$ has a value of 0 to 2.5 inclusive, and the sum of $a+b$ has a value of 1 to 3 inclusive.

7. A curable organopolysiloxane composition in accordance with claim 6, comprising the imido-substituted organopolysiloxane and styrene.

8. A curable organopolysiloxane composition in accordance with claim 6, comprising the imido-substituted organopolysiloxane and N-phenylmaleimide.

9. A curable organopolysiloxane composition in accordance with claim 6, comprising the imido-substituted organopolysiloxane and diallylphthalate.

References Cited

UNITED STATES PATENTS 3,444,128   5/1969   Wu _____ 260—46.5

SAMUEL H. BLECH, Primary Examiner

U.S. Cl. X.R.

117—93, 161; 204—159.13, 181; 260—18, 30.2, 31.2, 31.8, 32.6, 32.8, 33.6, 33.8, 37, 41, 46.5, 326, 326.5, 448.2, 448.8